United States Patent [19]

Vink et al.

[11] 4,270,956
[45] Jun. 2, 1981

[54] METHOD FOR CONTROLLING WEIGHT OF SUGAR-CONTAINING SOLID SHAPES AND PRODUCT

[75] Inventors: Walter Vink, Purdys Station; Leonard Spooner, Port Chester; Donald A. M. Mackay, Pleasantville all of N.Y.

[73] Assignee: Life Savers, Inc., New York, N.Y.

[21] Appl. No.: 121,945

[22] Filed: Feb. 15, 1980

[51] Int. Cl.³ .......................... C13F 3/00; A23G 3/00
[52] U.S. Cl. ........................................ 127/29; 127/30; 127/63; 426/660
[58] Field of Search .............................. 127/29, 63, 30; 426/660

[56] References Cited

U.S. PATENT DOCUMENTS

| 2,400,292 | 5/1946 | Dalton | 127/30 |
|---|---|---|---|
| 2,409,816 | 10/1946 | Wadsworth | 426/48 |
| 2,742,365 | 4/1956 | Corman | 426/48 |
| 2,807,559 | 9/1957 | Steiner | 127/30 |
| 2,938,799 | 5/1960 | Toulmin, Jr. | 426/48 X |
| 3,556,811 | 1/1971 | Smith | 426/660 |
| 3,639,169 | 2/1972 | Broeg | 426/660 |
| 3,826,857 | 7/1974 | Horn | 426/660 |

OTHER PUBLICATIONS

Chemical Abstracts, 80: 147,146n (1974).
Chemical Abstracts, 83: 148,179z (1975).

Primary Examiner—Sidney Marantz
Attorney, Agent, or Firm—Lawrence S. Levinson; Burton Rodney

[57] ABSTRACT

A method for controlling the weight and size of sugar-containing solid pieces, such as tablets or candies wherein a controlled amount of dextrans having a given molecular weight are incorporated with the ingredients forming the sugar-containing solid pieces to thereby cause reduction in the weight and size of the solid pieces; and the resulting sugar-containing solid pieces of desired weight and size, containing a given amount of dextrans having a given molecular weight.

14 Claims, 1 Drawing Figure

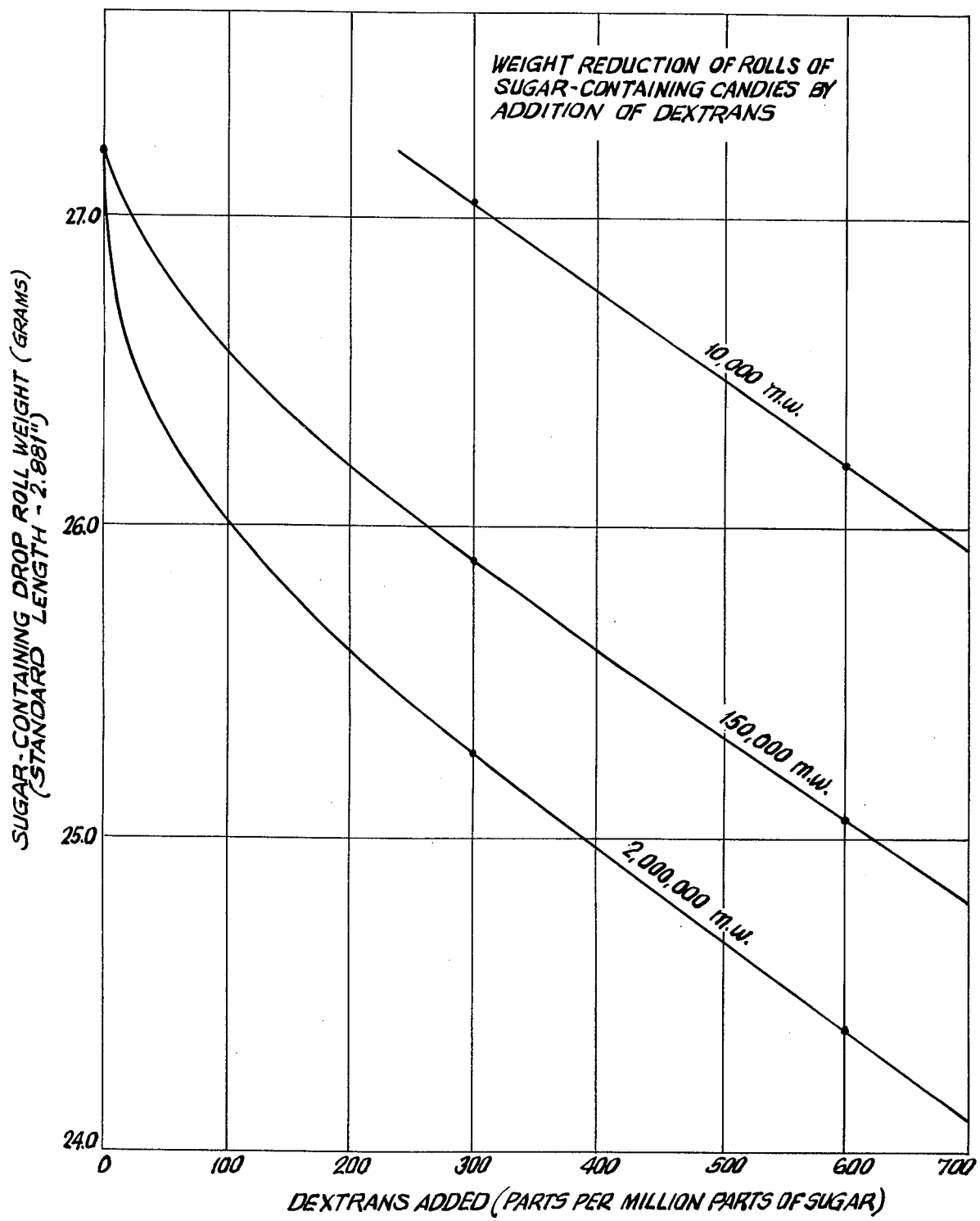

4,270,956

METHOD FOR CONTROLLING WEIGHT OF SUGAR-CONTAINING SOLID SHAPES AND PRODUCT

FIELD OF THE INVENTION

The present invention relates to a method for controlling the size and weight of sugar-containing solid pieces and to the product produced thereby.

BACKGROUND OF THE INVENTION

Dextrans are polysaccharides of a varying molecular weight composed exclusively of α-D-gluco-pyranosyl units but differing only in degree of branching and chain length. They are produced by bacteria growing on a sucrose substrate.

It has been found that during the harvesting of sugar cane, the bacteria in the soil acting on the sugar cane causes formation of dextrans. The dextrans tend to plasticize the sugar containing same. Thus, when dextran-containing sugar is employed in making candy drops or tablets, it has been found that the dextrans cause distortion of the candy pieces.

BRIEF STATEMENT OF THE INVENTION

In accordance with the present invention, a method is provided for controlling distortion in sugar-containing solid pieces as caused by dextrans as well as a method for controlling the size and weight of sugar-containing solid pieces. The above methods are carried out by incorporating with the ingredients forming the sugar-containing solid pieces a desired amount of dextran having a given molecular weight.

BRIEF DESCRIPTION OF FIGURE

The accompanying FIGURE is a graph showing weight reduction of rolls of sugar-containing hard candies by addition of dextrans of varying molecular weights.

DETAILED DESCRIPTION OF THE INVENTION

The sugar-containing solid pieces of the invention may contain from about 0.01 to about 0.1% by weight dextrans based on the weight of sugar present in the solid pieces or from about 100 to about 1000 ppm of dextrans (based on the parts of sugar present). In preferred embodiments, the solid pieces contain from about 0.03 to about 0.06% by weight dextrans based on the weight of the sugar present in the solid pieces or preferably from about 300 to about 600 ppm of dextrans (based on the parts of sugar present). The dextrans employed will have a molecular weight of within the range of from about 10,000 to about 2,000,000, and preferably from about 150,000 to about 1,000,000.

use of increasing amounts of dextrans of a given molecular weight, with the use of given amounts of dextrans of increasing molecular weights, or with the use of increasing amounts of dextrans of increasing molecular weights. That this is the case is clearly seen from the accompanying FIGURE which is a graph showing weight reductions of rolls of sugar-containing candies by addition of dextrans "Sugar-containing Drop Roll Weight (grams)" is plotted versus "Dextrans Added (parts per million parts of sugar)" for dextrans of molecular weights ranging from 10,000 to 2,000,000. As seen from the FIGURE, as increasing amounts of dextrans (e.g., from 1 to 700 ppm) of a given molecular weight are added in forming the sugar-containing drops, the weight of the sugar-containing drops decreases; furthermore, as a given amount of dextrans of increasing molecular weight (e.g., from 10,000 to 2,000,000) are added in forming the sugar-containing drops, the weight of sugar-containing drops decreases.

The sugar-containing solid pieces or candies of the invention of controlled weight and size, in addition to containing dextrans, will contain a major amount of sugar, preferably, cane sugar, upon which the dextrans act to reduce the size and weight of the solid pieces. Thus, an amount of sugar of from about 60 to about 90% and preferably from about 65 to about 85% based on the weight of the solid piece will be present.

The solid pieces, which may be in the form of tablets, pills, drops, squares, ovals, rectangles, other polygonal shapes, and the like, and may take the form of a boiled piece, will also contain other conventional ingredients depending upon the ultimate utility of the solid pieces. Thus, for example, the solid pieces may include flavors, flavoring oils, other sweeteners including natural or synthetic sweeteners, fillers, lubricants, and the like, where such solid pieces are formulated as candies.

In preparing the sugar and dextran containing solid pieces of the invention, a desired amount of dextran of a given average molecular weight is added to and intimately mixed with the ingredients to be used in forming the solid pieces. The desired size and weight of the ultimate solid pieces formed and packaged and the amount of sugar to be present will determine the amount of dextran to be used and its average molecular weight. This may easily be calculated by one skilled in the art with the use of graphs similar to the one shown in the FIGURE.

The following working Examples represent preferred embodiments of the present invention.

EXAMPLES 1 to 6

Boiled drops are prepared from the following formulations and the weight of a standard length roll of such boiled drops determined. The results obtained are outlined below.

| Example No. | 1 | 2 | 3 | 4 | 5 | 6 | Control |
|---|---|---|---|---|---|---|---|
| Sugar Dry wt. | 78.5% | 85% | 61% | 78% | 73.5% | 80% | 78.5% |
| Dextrans (molecular weight) | 300 ppm (10,000) | 600 ppm (10,000) | 300 ppm (150,000) | 600 ppm (150,000) | 300 ppm (2,000,000) | 600 ppm (2,000,000) | 0 |
| Corn syrup (Dry wt.) | 20% | 13% | 38% | 20% | 15% | 19% | 20% |
| Flavoring compounds | 1.5% | 2% | 1% | 2% | 1.5% | 1% | 1.5% |
| Weight of standard length roll (2.881 inches) | 27.04 g | 26.19 g | 25.88 g | 25.07 g | 25.26 g | 24.40 g | 27.20 g |

It has been found that the reduction of size and weight of the sugar-containing pieces increases with the As seen above, in comparing the weights of standard length rolls of Examples 1 and 2, 3 and 4, and 5 and 6 with each other and the results obtained in the Control, it is seen that the weights of the standard length rolls are reduced with increasing quantities of dextrans of the same molecular weight.

In addition, in comparing the weights of the standard length rolls of Examples 1, 3 and 5, and Examples 2, 4 and 6 with each other and the Control, it is seen that the weights of the standard length rolls are reduced with the same quantities of dextrans of increasing molecular weight.

Furthermore, upon examination of the individual boiled pieces, it is seen that the dextrans cause a reduction in diameter of the boiled pieces with increasing amounts of dextrans producing greater diameter reductions and increasing molecular weights of dextrans producing greater diameter reductions.

What is claimed is:

1. A method for controlling distortion of and for controlling the weight and thus the size of sugar-containing solid pieces, which comprises controlling the amount of dextrans having a given molecular weight in the sugar-containing solid pieces to thereby reduce the weight and size of the sugar-containing solid pieces to a desired degree.

2. The method as defined in claim 1 wherein the weight and size of the sugar-containing solid pieces are reduced by increasing the amount of dextrans of a given molecular weight.

3. The method as defined in claim 1 wherein the weight and size of the sugar-containing solid pieces are increasingly reduced by incorporating given amounts of dextrans of increasing molecular weights with the ingredients forming solid sugar-containing solid pieces.

4. The method as defined in claim 1 wherein the sugar-containing solid pieces comprise tablets, pills or drops of any desired shape.

5. The method as defined in claim 1 wherein the dextrans are present in an amount of from about 0.01 to about 0.1% by weight of the sugar present in said solid pieces.

6. The method as defined in claim 1 wherein the dextrans have an average molecular weight of within the range of from about 10,000 to about 2,000,000.

7. The method as defined in claim 1 wherein said solid pieces contain from about 60 to about 90% by weight sugar.

8. The method as defined in claim 1 wherein said sugar is cane sugar.

9. A sugar-containing solid piece having a desired weight and size comprising a sugar-containing solid having incorporated therein an effective amount of dextran of a given molecular weight to control distortion of the solid piece.

10. The sugar-containing solid piece as defined in claim 9 wherein the sugar-containing solid pieces comprise tablets, pills or drops of any desired shape.

11. The sugar-containing solid piece as defined in claim 9 wherein the dextrans are present in an amount of from about 0.01 to about 0.1% by weight of the sugar present in said solid piece.

12. The sugar-containing solid piece as defined in claim 9 wherein the dextrans have an average molecular weight of within the range of from about 10,000 to about 2,000,000.

13. The sugar-containing solid piece as defined in claim 9 wherein said solid pieces contain from about 60 to about 90% by weight sugar.

14. The sugar-containing solid piece as defined in claim 9 wherein said sugar is cane sugar.

* * * * *